United States Patent
Delegard et al.

(10) Patent No.: US 11,627,252 B2
(45) Date of Patent: Apr. 11, 2023

(54) CONFIGURATION OF OPTICAL SENSOR DEVICES IN VEHICLES BASED ON THERMAL DATA

(71) Applicant: Samsara Inc., San Francisco, CA (US)

(72) Inventors: Justin Joel Delegard, West Chester, OH (US); Kavya Joshi, San Francisco, CA (US); Abhinav Acharya, Pacifica, CA (US); John Charles Bicket, Burlingame, CA (US); Matthew Chasan, Sacramento, CA (US); Sabrina Quinn Shemet, San Francisco, CA (US); Kevin Lloyd, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/214,419

(22) Filed: Mar. 26, 2021

(65) Prior Publication Data

US 2022/0311939 A1    Sep. 29, 2022

(51) Int. Cl.
*H04N 5/232* (2006.01)
*G01K 3/00* (2006.01)
*B60R 11/00* (2006.01)
*B60R 11/04* (2006.01)

(52) U.S. Cl.
CPC ......... *H04N 5/23245* (2013.01); *G01K 3/005* (2013.01); *B60R 11/04* (2013.01); *B60R 2011/0003* (2013.01)

(58) Field of Classification Search
CPC ............... H04N 5/23245; G01K 3/005; B60R 2011/0003; B60R 11/04
See application file for complete search history.

(56) References Cited

U.S. PATENT DOCUMENTS

| 2019/0098199 A1* | 3/2019 | Hlatky | ............... H04N 5/23216 |
| 2020/0207252 A1* | 7/2020 | Guidi | ..................... G03B 15/02 |

* cited by examiner

*Primary Examiner* — Joseph W Becker
(74) *Attorney, Agent, or Firm* — Schwegman Lundberg & Woessner, P.A.

(57) ABSTRACT

Disclosed are systems, methods, and non-transitory computer-readable media for configuration of optical sensor devices in vehicles based on thermal data. To manage the temperature of an optical sensor device, temperature data describing the current temperature of the optical sensor is used to determine whether the current temperature meets or exceeds a predetermined threshold temperature. If the current temperature meets or exceeds the threshold temperature, the optical sensor device may be configured into a modified operating mode to reduce the current temperature of the optical sensor device. For example, the operating mode of the optical sensor device may be modified to terminate one or more processes, reduce a frame rate at which image/video data is captured, and the like.

20 Claims, 10 Drawing Sheets

CONFIGURATION OF OPTICAL SENSOR DEVICES IN VEHICLES BASED ON THERMAL DATA

TECHNICAL FIELD

Embodiments of the present subject matter relate generally to vehicles and, more specifically, to configuration of optical sensor devices in vehicles based on thermal data.

BACKGROUND

Cameras are used in vehicles for a variety of purposes. For example, cameras are used to analyze the road, the driver's behavior, and the like. In many cases, cameras are attached to a vehicle dashboard or windshield to provide for an unobstructed view of the road and/or driver. While these locations are beneficial for capturing video, they also generally receive direct sunlight. As a result, the cameras can get hot during daylight hours, which can lead to technical failures. Accordingly, improvements are needed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
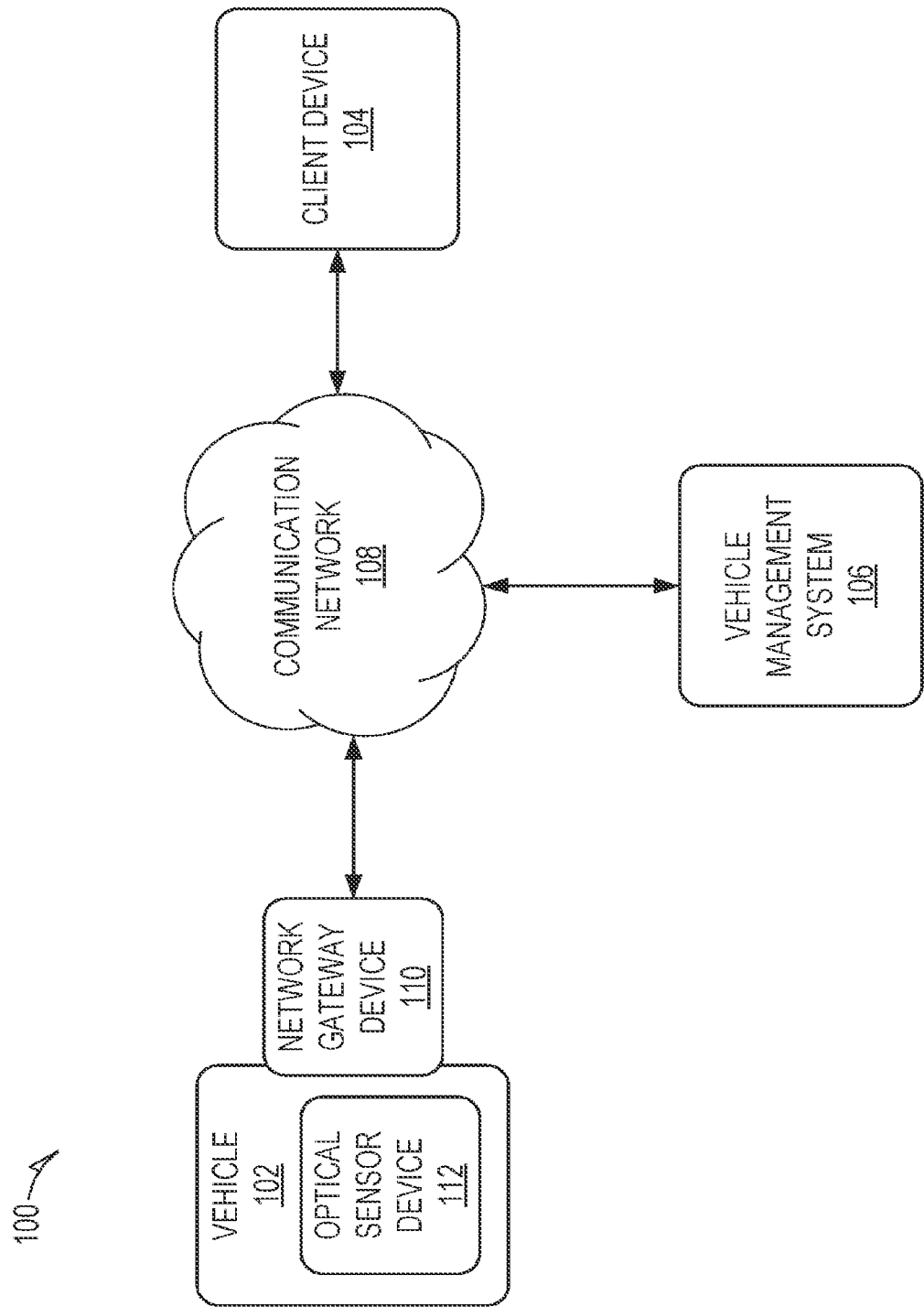
FIG. 1 shows a system for configuration of optical sensor devices in vehicles based on thermal data, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for configuration of optical sensor devices in vehicles based on thermal data. An optical sensor device may include sensors for capturing temperature data describing a current temperature of the optical sensor device, or a portion thereof. For example, an optical sensor device may include a sensor that captures temperature data describing the current temperature of a central processing unit (CPU) of the optical sensor device. Excessive temperatures may damage a CPU and therefore many CPUs are designed to shut off at a predetermined critical temperature. To avoid a sudden shutoff of the CPU, an operational state of the optical sensor device may be modified to reduce the temperature of the CPU and maintain a temperature that is below the critical temperature.

To manage the temperature of an optical sensor device, temperature data describing the current temperature of the optical sensor is used to determine whether a current temperature meets or exceeds a predetermined threshold temperature. For example, the threshold temperature may be a temperature that is less than the critical temperature at which the CPU will automatically shut off. If the current temperature meets or exceeds the threshold temperature, the optical sensor device may be configured into a modified operating mode to reduce the current temperature of the optical sensor device. For example, the operating mode of the optical sensor device may be modified to terminate one or more processes, reduce a frame rate at which image/video data is captured, and the like.

The operating mode of the optical sensor device may be returned to its previous operating state when the current temperature of the optical sensor device falls back below the predetermined threshold temperature or below another predetermined threshold temperature. For example, the operating mode of the optical sensor device may be returned to its previous operating state by reinitiating processes that were terminated, increasing the frame rate at which image/video data is captured, and the like.

The operating mode of an optical sensor device may be modified based on a configuration document that defines one or more threshold temperatures at which an operating mode of the optical sensor device is to be modified. The threshold values included in the configuration document may include corresponding instructions for modifying the operating mode of the optical sensor device. For example, the configuration document may define one or more processes to be terminated if a corresponding threshold temperature is met. As another example, the configuration document may identify a modification to the functioning of the optical sensor device, such as a reduced frame rate, that should be caused if the corresponding threshold temperature is met.

In some embodiments, the configuration document may identify a set of rules for modifying the operating mode of the optical sensor device. For example, the set of rules may be based on a state of the vehicle, such as whether the vehicle is in operation, the speed at which the vehicle is traveling, and the like. As another example, the set of rules may be based on sensor data describing the surrounding of the vehicle, such as whether objects or vehicles are being detected in proximity of the vehicle.

FIG. 1 shows a system 100 for configuration of optical sensor devices in vehicles based on thermal data, according to some example embodiments. As shown, multiple devices (i.e., vehicle 102, client device 104, and vehicle management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device.

As shown, the vehicle 102 is equipped with an optical sensor device 112. The optical sensor device 112 comprises one or more components for capturing sensor data describing performance of the vehicle 102, actions performed by the vehicle operator and/or other vehicle passenger, as well as data describing the vehicle's 102 surrounding environment. For example, the optical sensor device 112 may include one or more individual optical sensors (e.g., cameras) for capturing image/video data. The optical sensor device 112 may further include processing components (e.g., CPU) for processing the captured sensor data as well as managing performance of the optical sensor device 112.

As explained earlier, excessive temperatures may damage components of an optical sensor device 112, such as the CPU. To avoid damage or a sudden shutoff caused by excessive temperatures, the optical sensor device 112 modifies its operating mode to manage the temperature of the optical sensor device 112 and/or its individual components. For example, the optical sensor device 112 uses temperature data describing the current temperature of the optical sensor device 112 and/or its individual components to determine whether the current temperature meets or exceeds a predetermined threshold temperature. If a threshold is met, the optical sensor device 112 modifies its operating mode to reduce the current temperature. For example, the operating mode may be modified to terminate one or more processes, reduce a frame rate at which image/video data is captured, and the like.

The optical sensor device 112 modified its operating mode based on a configuration document that defines one or more threshold temperatures at which the operating mode of the optical sensor device 112 is to be modified, and corresponding instructions for modifying the operating mode of the optical sensor device 112. The configuration document may be pre-loaded into the optical sensor device 112, such as during manufacturing of the optical sensor device 112. The configuration document may also be provided to the optical sensor device 112 and/or modified remotely via the communication network 108. For example, the vehicle management system 106 may communicate with the optical sensor device 112 to load and/or modify the configuration document.

The vehicle management system 106 is a computing system consisting of one or more computing devices configured to provide remote management of vehicles 102. For example, the vehicle management system 106 may allow a fleet manager and/or authorized administrator to define the configuration document for managing the temperature of an optical sensor device 112.

To utilize the functionality of the vehicle management system 106, users (e.g., administrators, fleet managers) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the vehicle management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with a vehicle management system 106 via a client-side application installed on the client device 104. In some embodiments, the client-side application includes a component specific to the vehicle management system 106. For example, the component may be a stand-alone application, one or more application plug-ins, and/or a browser extension. However, the users may also interact with the vehicle management system 106 via a third-party application, such as a web browser or messaging application, that resides on the client device 104 and is configured to communicate with the vehicle management system 106. In either case, the client-side application presents a user interface (UI) for the user to interact with the vehicle management system 106. For example, the user interacts with the vehicle management system 106 via a client-side application integrated with the file system or via a webpage displayed using a web browser application.

As discussed earlier, the vehicle management system 106 enables users to generate and/or modify a configuration document for managing the temperature of an optical sensor device 112 implemented within a vehicle 102. For example, the vehicle management system 106 may provide a user interface that allows users to generate the configuration document, such as by defining threshold temperatures and corresponding modifications to be made to the operating mode of the optical sensor device 112 when a threshold temperature is met. The user interface may also enable a user to select a vehicle 102 or group of vehicles 102 at which a configuration document is to be implemented.

The vehicle management system 106 communicates remotely with a vehicle 102 via the communication network 108 to implement or modify a configuration document. For example, the vehicle management system 106 may provide a newly generated configuration document to the vehicle 102 or access/modify an existing configuration document maintained by the vehicle 102. Accordingly, the vehicle management system 106 allows for the operation of the optical sensor device 112 to be managed remotely by a user. A user may therefore remotely manage their efforts to maintain desirable temperature levels of the optical sensor devices 112 implemented in the vehicles 102.

In some embodiments, the vehicle management system 106 may also receive log data from the vehicles 102 that describe the detected temperatures of the optical sensor devices 112, as well as modifications performed to the operating mode of the optical sensor devices 112. The vehicle management system 106 may make the logging data available to users, such as through a user interface. A user can use this presented data to monitor/analyze the temperatures at each vehicle 102 and the impact that the modifications to the operating mode have on the temperatures. For example, the user may use the presented data to further refine the configuration document implemented at each vehicle 102 as needed to further improve management of the temperatures.

While the vehicle 102 is shown as including only an optical sensor device 112, this is not mean to be limiting. The vehicle 102 may be implemented with any of a variety of other sensors, such as engine speed sensors, fuel temperature sensors, voltage sensors, pressure sensors, radar sensors, light detection and ranking (LIDAR) sensors, audio sensors (e.g., microphones), and the like.

Figure 2:
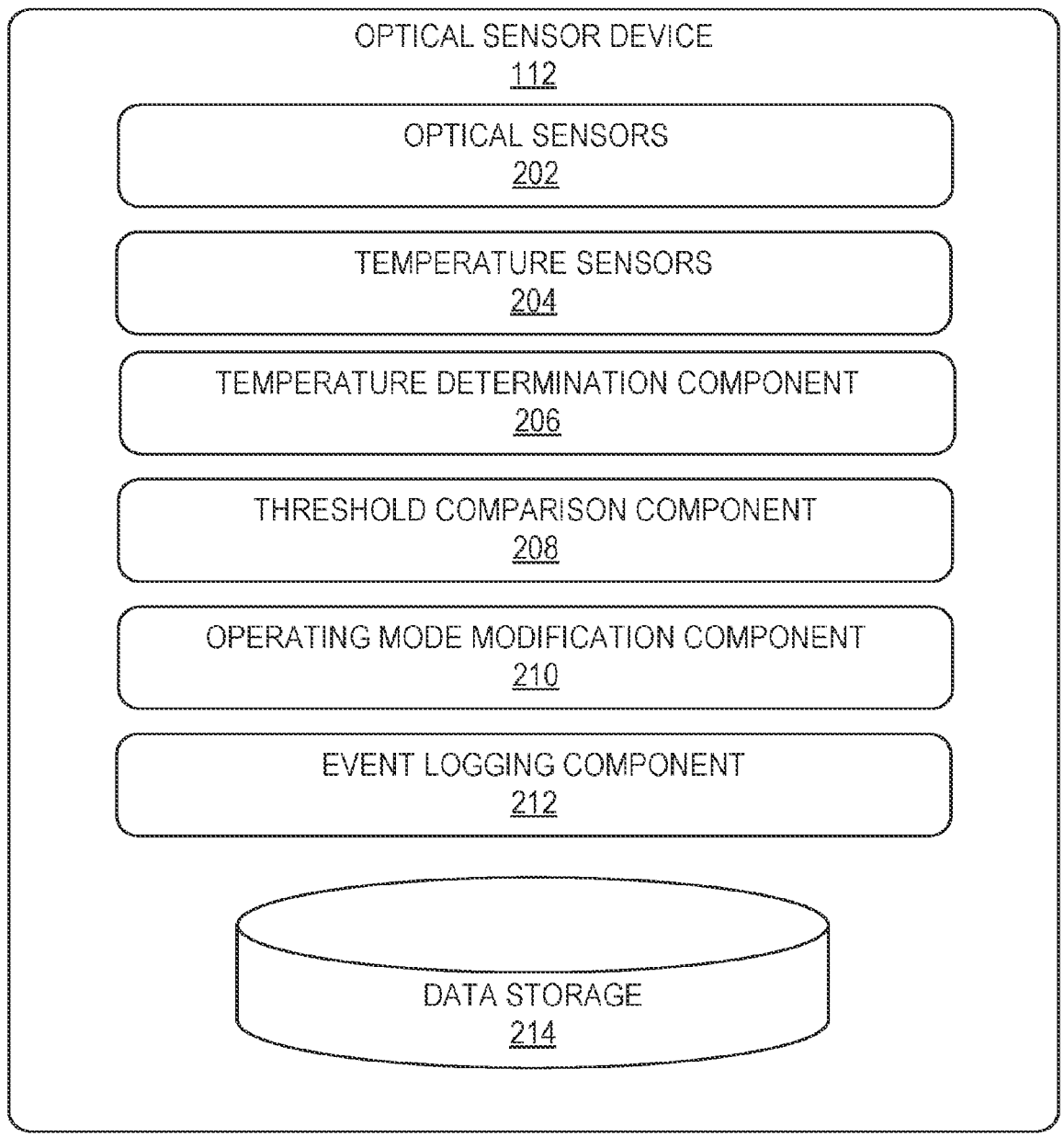
FIG. 2 is a block diagram of an optical sensor device, according to some example embodiments.

FIG. 2 is a block diagram of an optical sensor device 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the optical sensor device 112 to facilitate additional functionality that is not specifically described herein. Furthermore, the various functional components depicted in FIG. 2 may reside on a single computing device or may be distributed across several computing devices (e.g., the optical sensor device 112 and the vehicle management system 106) in various arrangements such as those used in cloud-based architectures.

As shown, the optical sensor device 112 includes optical sensors 202, temperature sensors 204, a temperature determination component 206, a threshold comparison component 208, an operating mode modification component 210, an event logging component 212, and a data storage 214.

The optical sensors 202 includes one or more sensors configured to capture image data, such pictures, video, and the like. For example, the optical sensors 202 may be cameras, such as dashboard cameras, used to capture images and video during operation of a vehicle 102. The optical sensors 202 may be implemented at various locations and in various positions throughout a vehicle 102 to capture a variety of image data. For example, the optical sensors 202 may be implemented on or near a front dashboard of a vehicle 102 and positioned outwards to capture the route (e.g., road) being traversed by the vehicle 102. As another example, an optical sensor 202 implemented on or near a front dashboard of a vehicle 102 may be positioned inwards to capture image data of a vehicle operator or other vehicle passengers.

Optical sensors 202 may be positioned at any other position of a vehicle 102 to capture the surroundings of the vehicle 102. For example, optical sensors 202 may be positioned along the sides, back, top, and/or underneath a vehicle 102. In any case, the optical sensors 202 may capture image data and provide the image data to other components of the optical sensor device 112.

The temperature sensors 204 capture sensor data describing a current temperature of a device and/or environment. For example, temperature sensors 204 may be embedded into components, such as CPUs, optical sensors 202, to capture sensor data describing the current temperature of the component. The temperature sensors 204 may provide the captured temperature data to the other components of the optical sensor device 112.

The temperature determination component 206 determines a current temperature of the optical sensor device 112. The current temperature may include an overall temperature of the optical sensor device 112 or the environment of the optical sensor device 112, as well as the current temperature of individual components of the optical sensor device 112. For example, the temperature determination component 206 may determine the current temperature for each individual CPU and/or optical sensor 202 included in the optical sensor device 112. Accordingly, the temperature determination component 206 may determine a variety of current temperature values.

The temperature determination component 206 determines the current temperatures based on temperature data captured by the temperature sensors 204. The temperature determination component 206 may determine the current temperature of the optical sensor device 112 and/or individual component (e.g., CPU) or components of the optical sensor device 112. The temperature determination component 206 may determine a current temperature based on temperature data gathered by a single temperature sensor 204 or multiple temperature sensors 204. For example, the temperature determination component 206 may determine individual current temperature values based on temperature data received from multiple individual temperature sensors 204 and then determine a cumulative current temperature value based on the individual current temperature values, such as by determining the average of the individual current temperature values.

The temperature determination component 206 may provide the temperature values to the other components of the optical sensor device 112 along with data identifying the component associated with the temperature value. For example, the temperature determination component 206 may include a unique identifier with the temperature value to identify the component (e.g., CPU, optical sensor 202) associated with the temperature value. The temperature determination component 206 may also include timestamp data indicating a time at which the current temperature was determined. In some embodiments, the temperature determination component 206 may generate a record of the temperature values, including the unique identifiers and/or timestamps. For example, the temperature determination component 206 may update a temperature log stored in the data storage 214 with the temperature values, identifiers, and/or timestamps.

The threshold comparison component 208 uses the temperature values determined by the temperature determination component 206 to determine whether a threshold temperature value has been met. The threshold values are defined by a configuration document stored in the data storage 214. Accordingly, the threshold comparison component 208 access the configuration document from the data storage 214.

The configuration document includes one or more threshold temperature values along with actions to be performed if a current temperature of the optical sensor device 112 satisfies the threshold temperature value. For example, the configuration document may include instructions for modifying the operating mode of the optical sensor device 112 if a threshold temperature value is met.

The configuration document may include data identifying conditions for satisfying each threshold temperature value. For example, the configuration document may indicate that a threshold temperature value is met if the current temperature meets or exceed the threshold temperature value. As another example, the configuration document may indicate that a threshold temperature value is met if the current temperature is below the threshold temperature value. In some embodiments, a threshold temperature value may be met based on the current temperature passing the threshold temperature value in either direction, such as by increasing to exceed threshold temperature value or falling below the threshold temperature value. In this type of embodiment, the configuration document may define different sets of actions to be performed based on whether the threshold temperature was met by an increase in the temperature value or a decrease in the temperature value.

The configuration document may also include different threshold temperature values for different components and/or sets of components of the optical sensor device 112. For example, the configuration document may include different sets of threshold temperature values for different CPUs or optical sensors 202. The different sets of threshold temperature values in the configuration document may be associated with unique identifies that identify the components to which the threshold temperatures values relate. The threshold comparison component 208 may use the unique identifier associated with a temperature value to identify the correct set of threshold temperature values from the configuration document.

The threshold comparison component 208 notifies the operating mode modification component 210 in the event that a threshold temperature value has been met. For example, the threshold comparison component 208 may provide the operating mode modification component 210 with data identifying the specified threshold temperature value in the configuration document that was met, the component of the optical sensor device 112 that met the threshold temperature value, the temperature value of the component, and the like.

The operating mode modification component 210 modifies an operating mode of the optical sensor device 112 to manage the temperature of the optical sensor device 112 and/or the temperature of individual components of the optical sensor device 112. For example, the operating mode modification component 210 may execute the actions associated with the threshold temperature value in the configuration document to modify the operating mode of the optical sensor device 112. The actions may include terminating or reducing use of specified processes that are performed by a particular CPU and/or optical sensor 202 with the intention of reducing the temperature at the particular CPU and/or optical sensor 202. As another example, the actions may include reducing a frame rate at which an optical sensor 202 captures image data to reduce the temperature at the optical sensor 202 and/or a corresponding CPU. Conversely, the actions defined by the configuration document may include resuming use of specified processes, increasing use of specified processes, and/or increasing the frame rate at which an optical sensor 202 captures image data. For example, the configuration document may dictate that these actions be performed in the event that the temperature falls below a specified threshold temperature indicating that the risk of damage or failure caused by excessive heat has been mitigated.

In some embodiments, the configuration document may list the specified actions to be performed, such as listing the specific processes to be terminated, modified frame rate to be initiated, and the like. Alternatively, the configuration document may identify a set of instructions for determining which actions are to be performed. For example, the set of instructions may be based on data describing the current state of the vehicle 102, the set of active processes being executed, and the like.

In this type of embodiment, the operating mode modification component 210 may gather data describing the current state of the vehicle 102, such as whether the vehicle 102 travelling, parked, the speed at which the vehicle 102 is travelling, the current time, and the like, as well as data identifying the active processes being executed by the optical sensor device 112, and use the gathered data along with the set of instructions defined by the configuration document to modify the operating mode of the optical sensor device 112.

As an example, the set of instructions may define a ranking of the processes along with an instruction to terminate the three highest ranked active processes if the threshold temperature value is met. In type of embodiment, the operating mode modification component 210 may identify the active processes being executed by the optical sensor device 112 and then use the ranking defined by the set of instructions to identify the three processes to terminate.

As another example, the set of instructions my define different actions to be performed based on the current state of the vehicle 102. For example, the set of instructions may define different sets of actions based on whether the vehicle 102 is parked versus moving. As another example, the set of instructions may define different sets of actions based on whether a current speed of the vehicle 102 is above or below a specified threshold. As another example, the set of instructions may define different sets of actions based on the surroundings of the vehicle 102, such as whether objects (e.g., other vehicles 102, persons, obstacles, etc.) are detected in the proximity of the vehicle 102, at a specified rate, within a specified threshold proximity, and/or whether a number of detected objects is below or above a specified threshold number. As another example, the set of instructions may define different sets of actions based on the current time and/or whether the specified function which the vehicle 102 is performing, such as delivering items, transporting people, returning to a vehicle hub, and the like.

In any case, the operating mode modification component 210 gathers data describing the current state of the vehicle 102, such as sensor data describing the vehicle's 102 movement and/or surroundings, the current time, and the like. The operating mode modification component 210 may use this gathered data to determine the current state of the vehicle 102, which is then used along with the set of instructions to determine the appropriate actions to be performed.

In some embodiments, an occurrence of a threshold temperature being met may be logged and/or an alert may be transmitted to a specified user. In these types of embodiments, the event logging component 212 manages generating the log of the threshold temperature being met. The log may be stored in the data storage 214 and/or maintained by the vehicle management system 106. The event logging component 212 may therefor communicate with either to log the detected occurrence. The logged event may identify the associated vehicle 102, threshold temperature value that was met, the temperature of the optical sensor device 112, a time of the detected event, actions executed in response to the threshold temperature value being met, and the like.

The event logging component 212 and/or the vehicle management system 106 may generate and transmit a notification based on the detected event. For example, the notification may include some or all of the logged data associated with the event. The notification may be transmitted to a contact identifier associated with a specified user, such as an email address, phone number, and the like.

Figure 3:
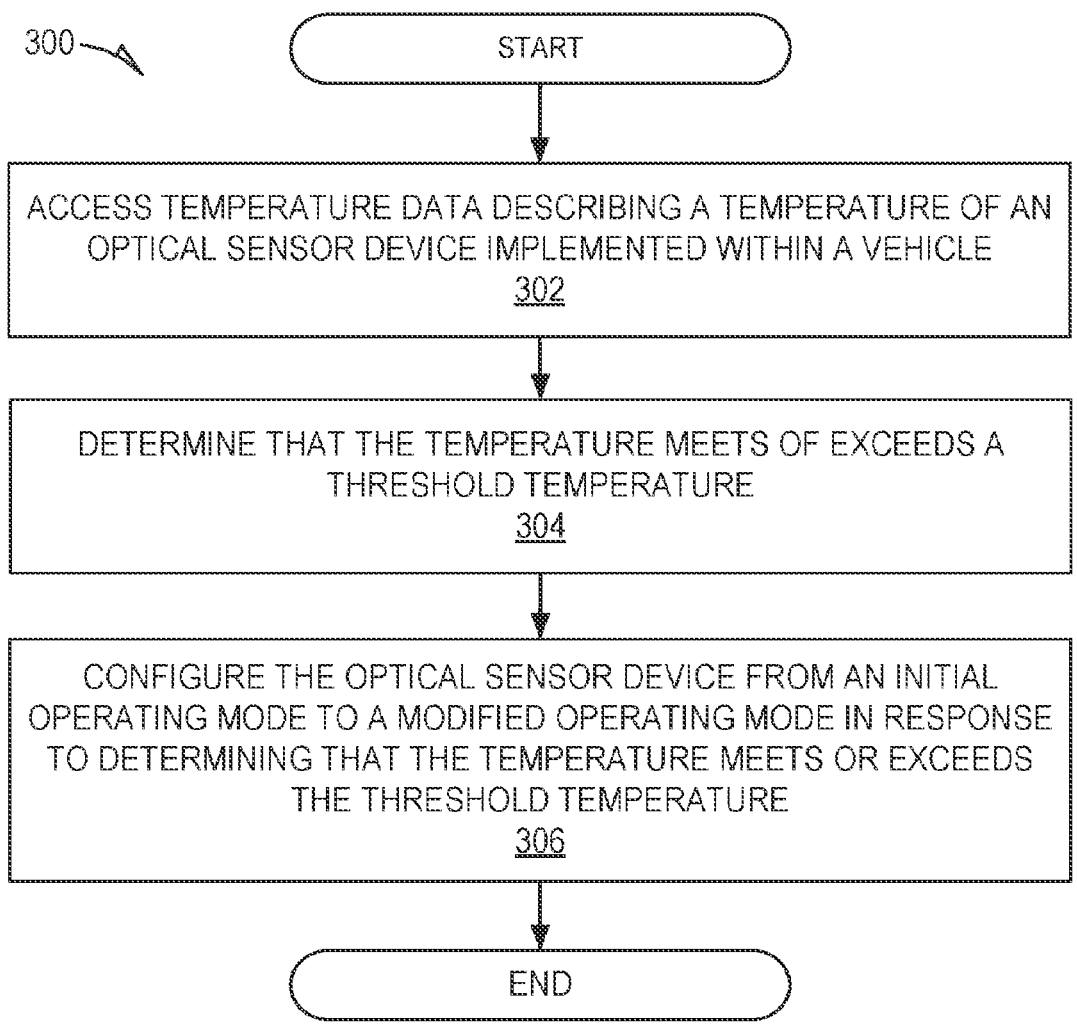
FIG. 3 is a flowchart showing a method for configuring an optical sensor device into a modified operating mode to reduce temperature, according to some example embodiments.

FIG. 3 is a flowchart showing a method 300 for configuring an optical sensor device into a modified operating mode to reduce temperature, according to some example embodiments. The method 300 may be embodied in computer readable instructions for execution by one or more processors such that the operations of the method 300 may be performed in part or in whole by the optical sensor device 112; accordingly, the method 300 is described below by way of example with reference thereto. However, it shall be appreciated that at least some of the operations of the method 300 may be deployed on various other hardware configurations, such as a combination of the optical sensor device 112 and the vehicle management system 106, and the method 300 is not intended to be limited to the optical sensor device 112.

At operation 302, the temperature determination component 206 accesses temperature data describing a temperature of an optical sensor device 112 implemented within a vehicle 102. The temperature determination component 206 may access the temperature data from temperature sensors 205 implemented by the optical sensor device 112. The temperature determination component 206 uses the temperature data to determine a temperature of the optical sensor device 112 or a component of the optical sensor device 112.

At operation 304, the threshold comparison component 208 determines that the temperature meets or exceeds a threshold temperature. For example, the threshold comparison component 208 accesses a configuration document from the data storage 214. The configuration document defines the threshold temperature. The threshold comparison component 208 compares the temperature determined by the temperature determination component 206 to the threshold temperature defined by the configuration document to determine whether the temperature meets or exceeds the threshold temperature.

At operation 306, the operating mode modification component 210 configures the optical sensor device 112 from an initial operating mode to a modified operating mode in response to determining that the temperature meets or exceeds the threshold temperature. For example, the operating mode modification component 210 executes a set of actions dictated by the configuration document to configure the optical sensor device 112 from an initial operating mode to a modified operating mode. The modified operating mode may cause a desired change in the temperature of the optical sensor device, such as be reducing the temperature. For example, the modified operating mode may include terminating active processes, reducing the frame rate at which optical sensors 202 gather image data, and the like.

Figure 4:
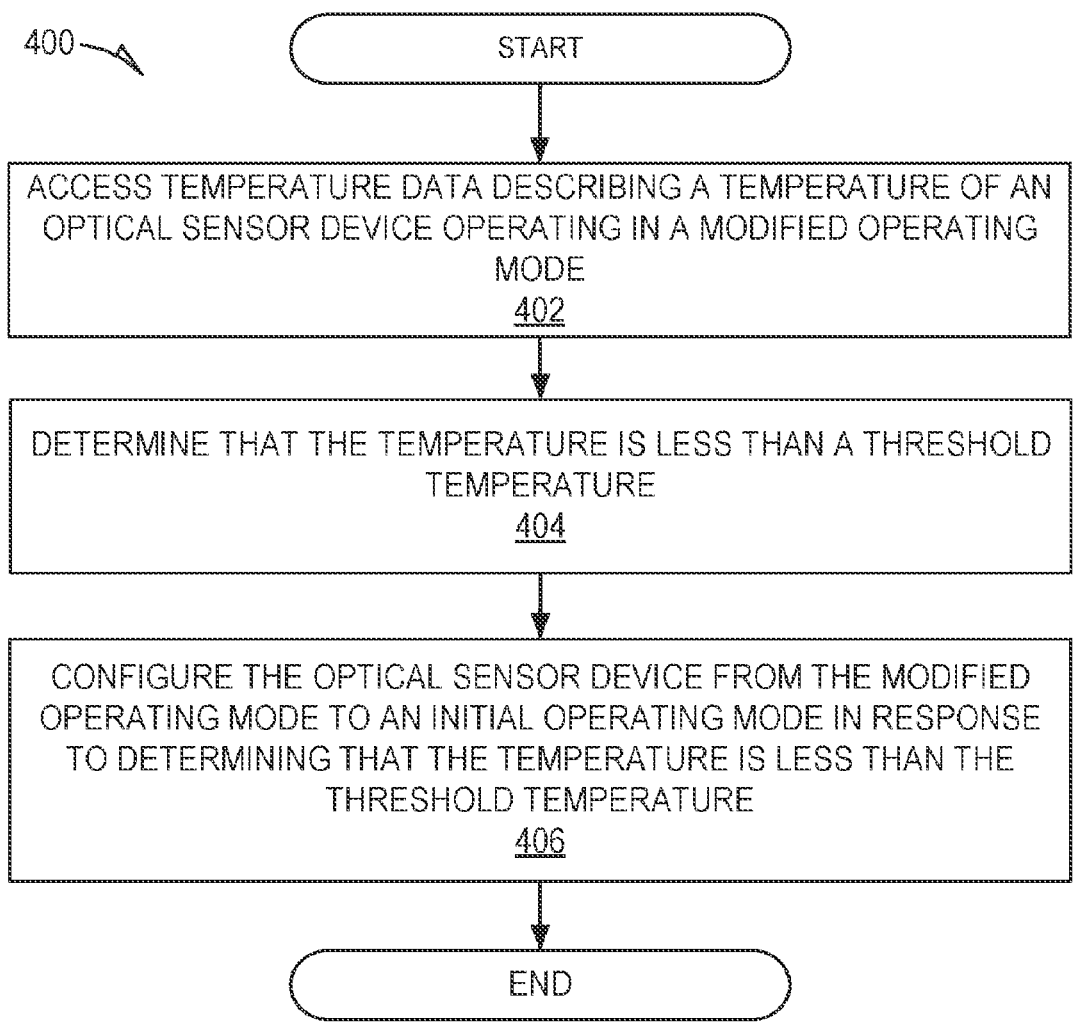
FIG. 4 is a flowchart showing a method for configuring an optical sensor device back into an initial operating mode from a modified operating mode, according to some example embodiments.

FIG. 4 is a flowchart showing a method 400 for detecting occurrence of an offensive term, according to some example embodiments. The method 400 may be embodied in computer readable instructions for execution by one or more processors such that the operations of the method 400 may be performed in part or in whole by the optical sensor device 112; accordingly, the method 400 is described below by way of example with reference thereto. However, it shall be appreciated that at least some of the operations of the method 400 may be deployed on various other hardware configurations, such as a combination of the optical sensor device 112 and the vehicle management system 106, and the method 400 is not intended to be limited to the optical sensor device 112.

At operation 402, the temperature determination component 206 accesses temperature data describing a temperature of an optical sensor device 112 operating in a modified operating mode. The temperature determination component 206 may access the temperature data from temperature sensors 205 implemented by the optical sensor device 112. The temperature determination component 206 uses the temperature data to determine a temperature of the optical sensor device 112 or a component of the optical sensor device 112.

At operation 404, the threshold comparison component 208 determines that the temperature is less than a threshold temperature. For example, the threshold comparison component 208 accesses a configuration document from the data storage 214. The configuration document defines the threshold temperature. The threshold temperature may be the same or different than the threshold temperature that was met to cause the configuration of the optical sensor device 112 to be modified from the initial operating mode to the modified operating mode.

The threshold comparison component 208 compares the temperature determined by the temperature determination component 206 to the threshold temperature defined by the configuration document to determine whether the whether the temperature is less than the threshold temperature.

At operation 406, the operating mode modification component 210 configures the optical sensor device 112 from the modified operating mode to an initial operating mode in response to determining that the temperature is less than the threshold temperature. For example, the operating mode modification component 210 executes a set of actions dictated by the configuration document to configure the optical sensor device 112 from the modified operating mode to the initial operating mode. The actions may include reversing actions performed to configure the optical sensor device 112 from the initial operating mode to the modified operating mode, such as by reinstating terminated active processes, increases the frame rate at which optical sensors 202 gather image data, and the like.

Figure 5:
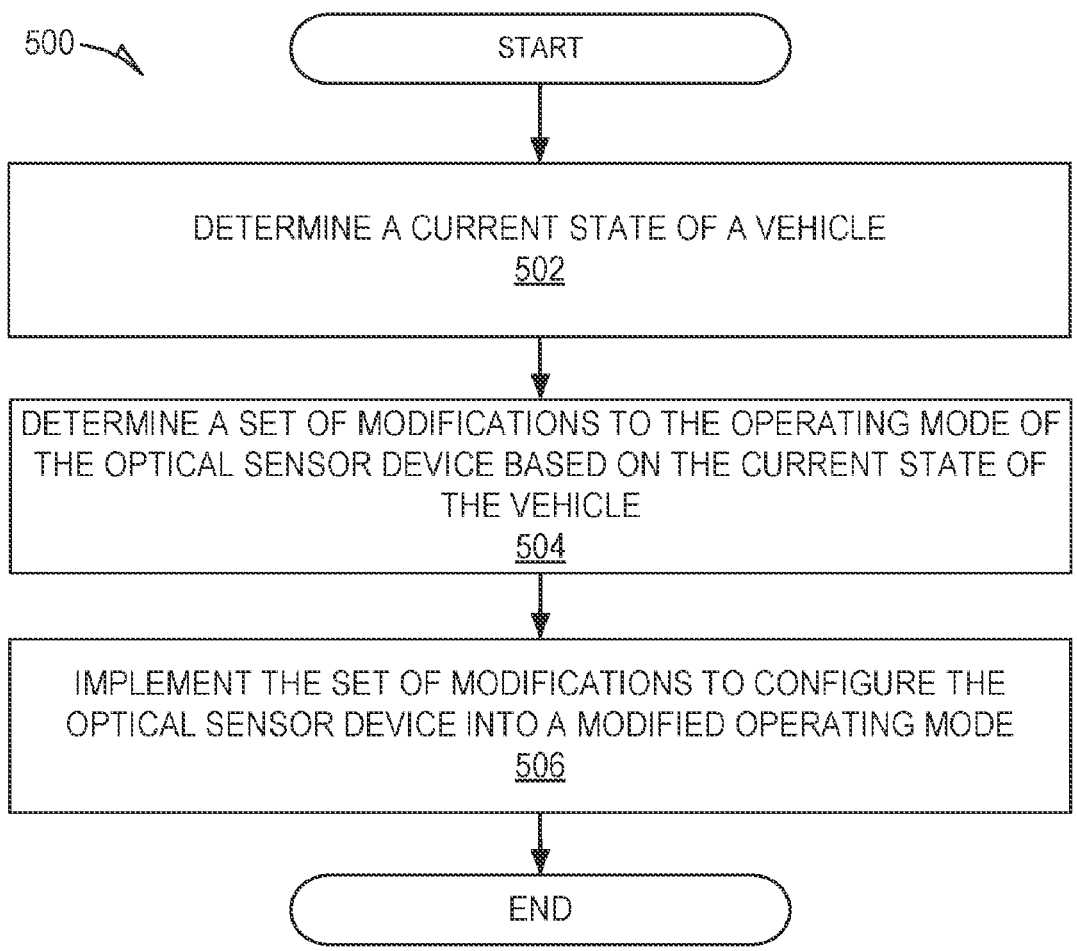
FIG. 5 is a flowchart showing a method for configuring an optical sensor device into a modified operating mode based on a current state of a vehicle, according to some example embodiments.

FIG. 5 is a flowchart showing a method 500 for configuring an optical sensor device into a modified operating mode based on a current state of a vehicle, according to some example embodiments. The method 500 may be embodied in computer readable instructions for execution by one or more processors such that the operations of the method 500 may be performed in part or in whole by the optical sensor device 112; accordingly, the method 500 is described below by way of example with reference thereto. However, it shall be appreciated that at least some of the operations of the method 500 may be deployed on various other hardware configurations, such as a combination of the optical sensor device 112 and the vehicle management system 106, and the method 500 is not intended to be limited to the optical sensor device 112.

At operation 502, the operating mode modification component 210 determines a current state of a vehicle 102. The current state of the vehicle 102 may be defined by a set of factors describing the operation, use, and/or environment of the vehicle 102. For example, the current state of the vehicle 102 may indicate whether the vehicle 102 is moving or parked, the speed at which the vehicle 102 moving, a number of passengers in the vehicle 102, detected object in the proximity of the vehicle 102, a current task or use of the vehicle 102, and the like.

The operating mode modification component 210 determines the current state of the vehicle 102 base on sensor data gathered from various sensors implemented within and/or or around the vehicle 102. The operating mode modification component 210 uses this gathered data to determine the current state of the vehicle 102.

At operation 504, the operating mode modification component 210 determines a set of modifications to the operating mode of the optical sensor device 112 based on the current state of the vehicle 102. A configuration document may identify a set of instructions for determining which actions are to be performed based on the current state of the vehicle 102. For example, the configuration document may dictate separate sets of actions to be performed based on the current state of the vehicle 102. Accordingly, the operating mode modification component 210 uses the current state of the vehicle 102 to identify the corresponding set of instructions from the configuration document.

At operation 506, the operating mode modification component 210 implements the set of modifications to configure the optical sensor device 112 into a modified operating mode.

Figure 6:
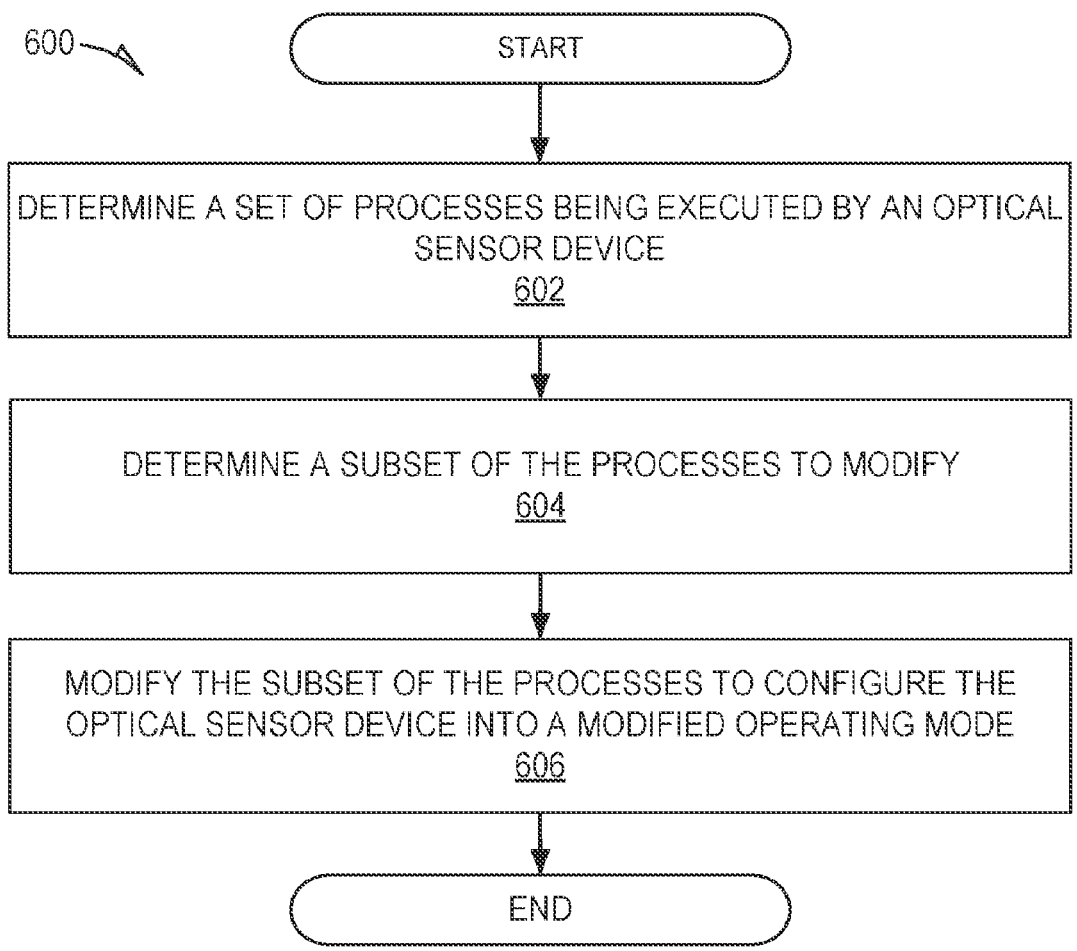
FIG. 6 is a flowchart showing a method for configuring an optical sensor device into a modified operating mode based on processes being executed by the optical sensor device, according to some example embodiments.

FIG. 6 is a flowchart showing a method 600 for configuring an optical sensor device into a modified operating mode based on processes being executed by the optical sensor device, according to some example embodiments. The method 600 may be embodied in computer readable instructions for execution by one or more processors such that the operations of the method 600 may be performed in part or in whole by the optical sensor device 112; accordingly, the method 600 is described below by way of example with reference thereto. However, it shall be appreciated that at least some of the operations of the method 600 may be deployed on various other hardware configurations, such as a combination of the optical sensor device 112 and the vehicle management system 106, and the method 600 is not intended to be limited to the optical sensor device 112.

At operation 602, the operating mode modification component 210 determines a set of processes being executed by an optical sensor device 112. The set of processes may be active software processes being performed by the optical sensor device 112, such as active processes to provide services various image detection services.

At operation 504, the operating mode modification component 210 determines a subset of the processes to modify. The operating mode modification component 210 determines a subset based on a configuration document defining actions to be performed when a threshold temperature is met. For example, the configuration document may a ranking of various processes along with an instruction to terminate the three highest ranked active processes if the threshold temperature value is met. The operating mode modification component 210 uses the identified active processes being executed by the optical sensor device 112 and the ranking defined by the configuration document identify the subset of processes to terminate, such as the three highest ranked active processes.

At operation 506, the operating mode modification component 210 modifies the subset of processes to configure the optical sensor device 112 into a modified operating mode. For example, the operating mode modification component 210 may terminate the processes to reduce the temperature of the optical sensor device 112.

Figure 7:
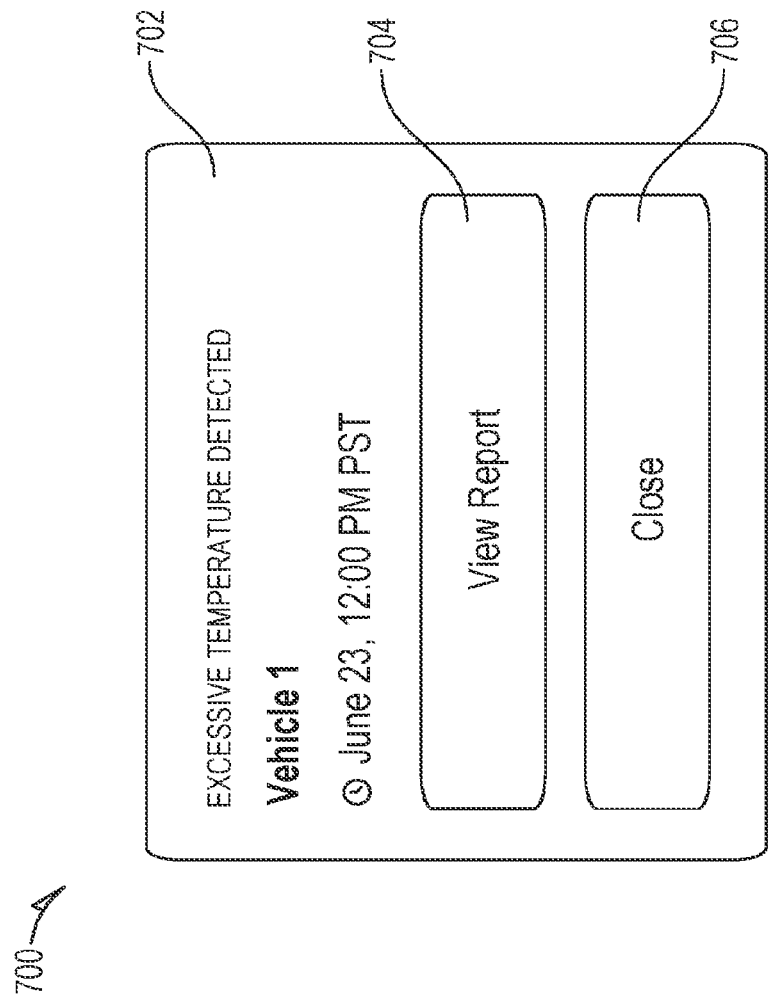
FIG. 7 is a notification indicating occurrence of excessive temperature, according to some example embodiments.

FIG. 7 is a notification 700 indicating occurrence of excessive temperature, according to some example embodiments. As shown, the notification 700 includes a text portion 702 that identifies that an excessive temperature was detected, identifies the vehicle 102, and the day/time at which the event occurred. The notification 700 also includes a view report button 704 and a close button 706. The view report button 704 enables a user to view a report of logged data associated with the detected occurrence. A user may select the view report button 704 to view the report. Alternatively, the user may select the close button 706 to dismiss the notification 700.

Figure 8:
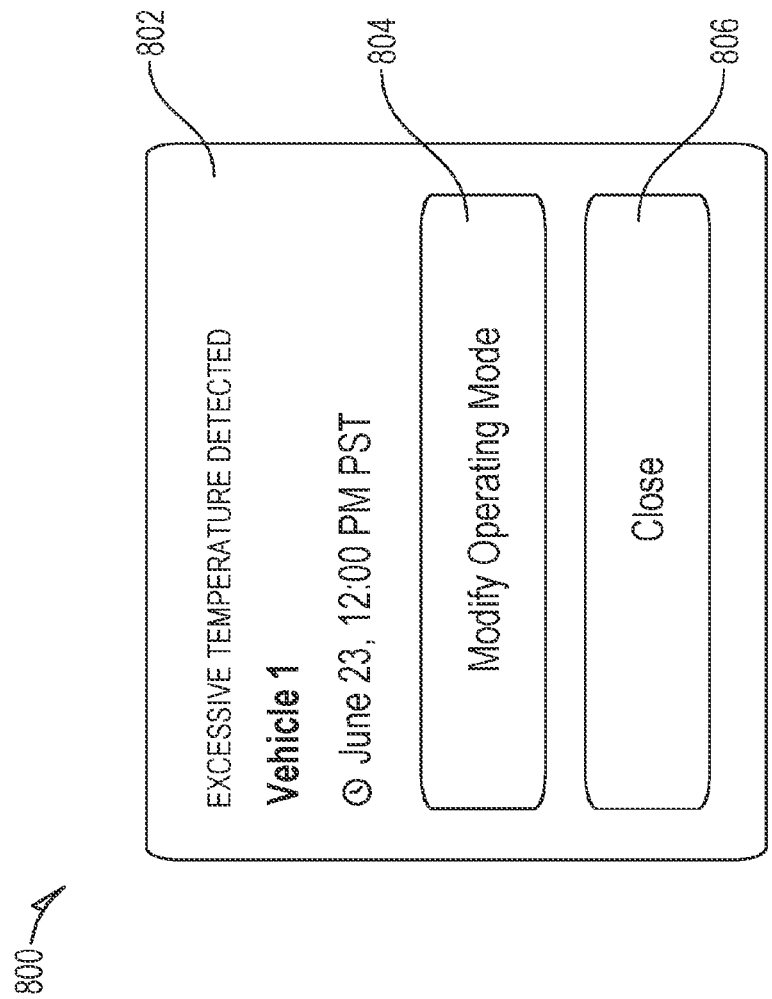
FIG. 8 is a notification indicating occurrence of excessive temperature, according to some example embodiments.

FIG. 8 is a notification 800 indicating occurrence of excessive temperature, according to some example embodiments. As shown, the notification 800 includes a text portion 802 that identifies that an excessive temperature was detected, identifies the vehicle 102, and the day/time at which the event occurred. The notification 800 also includes a modify operating mode button 804 and a close button 806. The modify operating mode button 804 enables a user to modify the operating mode of the optical sensor component 112 of the vehicle 102. For example, the a modify operating mode button 804 may direct a user to a user interface to modify or configure the configuration document for the vehicle or to transmit commands to the vehicle 102 to cause a specified modification to the operating mode of the optical sensor device 112. A user may select the modify operating mode button 804 to perform the corresponding functionality or, alternatively, the user may select the close button 806 to dismiss the notification 800.

Software Architecture

Figure 9:
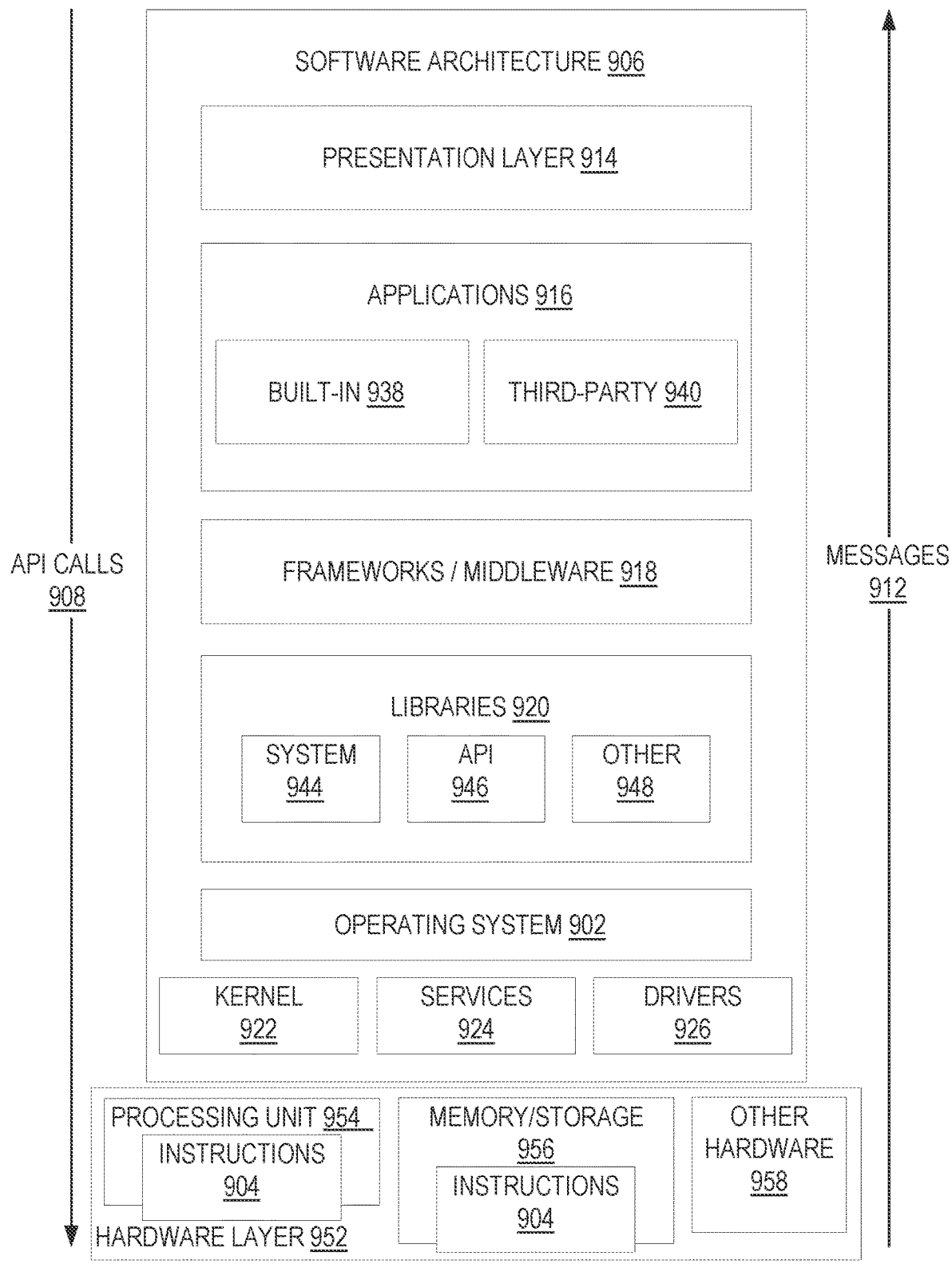
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914.

In these systems, the application/component "logic" can be separated from the aspects of the application/component that interact with a user.

Figure 10:
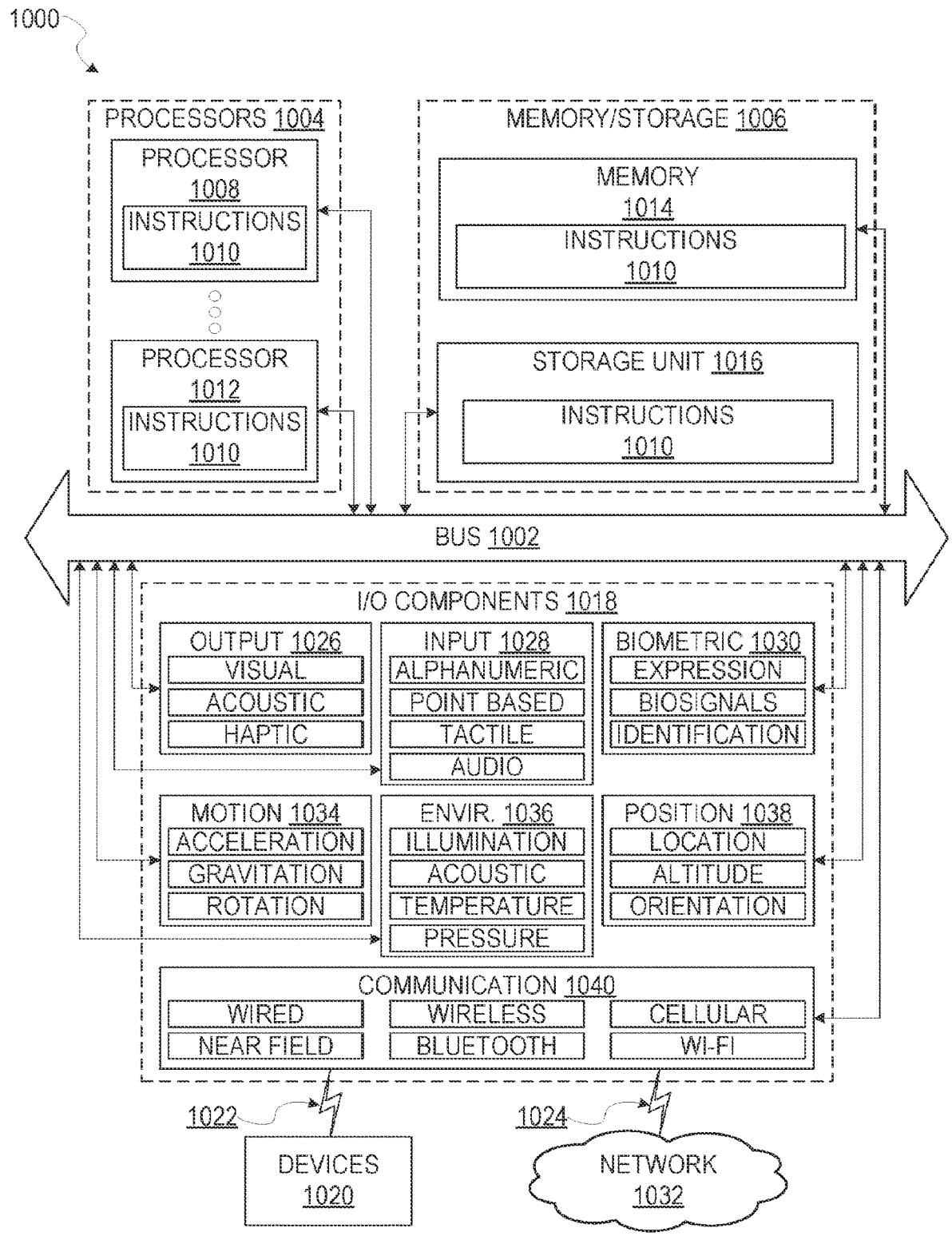
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   accessing temperature data describing a temperature of an optical sensor device implemented within a vehicle;
   determining that the temperature of the optical sensor device meets or exceeds a threshold temperature; and
   in response to determining that the temperature of the optical sensor device meets or exceeds the threshold temperature:
   causing display of a notification at a client device;
   receiving a request based on the notification;
   in response to the request:
   determining a set of active processes of the optical sensor device;
   gathering data generated by one or more sensor devices associated with the vehicle;
   determining a current state of the vehicle based on the data generated by the one or more sensor devices;
   ranking the set of active processes based on the current state of the vehicle according to a set of instructions associated with the threshold temperature;
   selecting a subset of the set of active processes based on the ranking; and
   terminating the subset of the set of active processes based on the request.

2. The method of claim 1, further comprising:
   after terminating the subset of the set of active processes, accessing subsequent temperature data describing an updated temperature of the optical sensor device;
   determining that the updated temperature of the optical sensor device is less than the threshold temperature; and
   in response to determining that the updated temperature of the optical sensor is less than the threshold temperature, initiating at least one process that was terminated.

3. The method of claim 1, further comprising:
   adjusting a frame rate at which image data is captured by the optical sensor device in response to determining that the temperature of the optical sensor device meets or exceeds the threshold temperature.

4. The method of claim 2, wherein initiating the at least one process comprises selecting the at least one process based on ranking.

5. The method of claim 1, further comprising:
   after terminating the subset of the set of active processes, accessing subsequent temperature data describing an updated temperature of the optical sensor device;
   determining that the updated temperature of the optical sensor device meets or exceeds a second threshold temperature that is greater than the threshold temperature; and
   in response to determining that the updated temperature of the optical sensor meets or exceeds the second threshold temperature, terminating at least one additional active process from an updated set of active processes of the optical sensor device.

6. The method of claim 5, further comprising:
   determining the updated set of active processes of the optical sensor device;
   ranking the updated set of active processes based on a second set of instructions associated with the second threshold temperature;
   selecting the at least one additional active processes based on the ranking of the updates set of active processes.

7. The method of claim 5, wherein the at least one additional active process is selected based on the ranking.

8. A system comprising:
   one or more computer processors; and
   one or more computer-readable mediums storing instructions that, when executed by the one or more computer processors, cause the system to perform operations comprising:
   accessing temperature data describing a temperature of an optical sensor device implemented within a vehicle;
   determining that the temperature of the optical sensor device meets or exceeds a threshold temperature; and
   in response to determining that the temperature of the optical sensor device meets or exceeds the threshold temperature:
   causing display of a notification at a client device;
   receiving a request based on the notification;

in response to the request:
  determining a set of active processes of the optical sensor device;
  gathering data generated by one or more sensor devices associated with the vehicle;
  determining a current state of the vehicle based on the data generated by the one or more sensor devices;
  ranking the set of active processes based on the current state of the vehicle according to a set of instructions associated with the threshold temperature;
  selecting a subset of the set of active processes based on the ranking; and
  terminating the subset of the set of active processes based on the request.

9. The system of claim 8, the operations further comprising:
  after terminating the subset of the set of active processes, accessing subsequent temperature data describing an updated temperature of the optical sensor device;
  determining that the updated temperature of the optical sensor device is less than the threshold temperature; and
  in response to determining that the updated temperature of the optical sensor is less than the threshold temperature, initiating at least one process that was terminated.

10. The system of claim 8, the operations further comprising:
  adjusting a frame rate at which image data is captured by the optical sensor device in response to determining that the temperature of the optical sensor device meets or exceeds the threshold temperature.

11. The system of claim 9, wherein initiating the at least one process comprises selecting the at least one process based on ranking.

12. The system of claim 8, the operations further comprising:
  after terminating the subset of the set of active processes, accessing subsequent temperature data describing an updated temperature of the optical sensor device;
  determining that the updated temperature of the optical sensor device meets or exceeds a second threshold temperature that is greater than the threshold temperature; and
  in response to determining that the updated temperature of the optical sensor meets or exceeds the second threshold temperature, terminating at least one additional active process from an updated set of active processes of the optical sensor device.

13. The system of claim 12, the operations further comprising:
  determining the updated set of active processes of the optical sensor device;
  ranking the updated set of active processes based on a second set of instructions associated with the second threshold temperature;
  selecting the at least one additional active processes based on the ranking of the updates set of active processes.

14. The system of claim 12, wherein the at least one additional active process is selected based on the ranking.

15. A non-transitory computer-readable medium storing instructions that, when executed by one or more computing devices, cause the one or more computing devices to perform operations comprising:
  accessing temperature data describing a temperature of an optical sensor device implemented within a vehicle;
  determining that the temperature of the optical sensor device meets or exceeds a threshold temperature; and
  in response to determining that the temperature of the optical sensor device meets or exceeds the threshold temperature:
  causing display of a notification at a client device;
  receiving a request based on the notification;
  in response to the request:
  determining a set of active processes of the optical sensor device;
  gathering data generated by one or more sensor devices associated with the vehicle;
  determining a current state of the vehicle based on the data generated by the one or more sensor devices;
  ranking the set of active processes based on the current state of the vehicle according to a set of instructions associated with the threshold temperature;
  selecting a subset of the set of active processes based on the ranking; and
  terminating the subset of the set of active processes based on the request.

16. The non-transitory computer-readable medium of claim 15, the operations further comprising:
  after terminating the subset of the set of active processes, accessing subsequent temperature data describing an updated temperature of the optical sensor device;
  determining that the updated temperature of the optical sensor device is less than the threshold temperature; and
  in response to determining that the updated temperature of the optical sensor is less than the threshold temperature, initiating at least one process that was terminated.

17. The non-transitory computer-readable medium of claim 15, the operations further comprising:
  adjusting a frame rate at which image data is captured by the optical sensor device in response to determining that the temperature of the optical sensor device meets or exceeds the threshold temperature.

18. The non-transitory computer-readable medium of claim 16, wherein initiating the at least one process comprises selecting the at least one process based on ranking.

19. The non-transitory computer-readable medium of claim 15, the operations further comprising:
  after terminating the subset of the set of active processes, accessing subsequent temperature data describing an updated temperature of the optical sensor device;
  determining that the updated temperature of the optical sensor device meets or exceeds a second threshold temperature that is greater than the threshold temperature; and
  in response to determining that the updated temperature of the optical sensor meets or exceeds the second threshold temperature, terminating at least one additional active process from an updated set of active processes of the optical sensor device.

20. The non-transitory computer-readable medium of claim 19, the operations further comprising:
  determining the updated set of active processes of the optical sensor device;
  ranking the updated set of active processes based on a second set of instructions associated with the second threshold temperature;
  selecting the at least one additional active processes based on the ranking of the updates set of active processes.

* * * * *

UNITED STATES PATENT AND TRADEMARK OFFICE
CERTIFICATE OF CORRECTION

| | | |
|---|---|---|
| PATENT NO. | : 11,627,252 B2 | Page 1 of 1 |
| APPLICATION NO. | : 17/214419 | |
| DATED | : April 11, 2023 | |
| INVENTOR(S) | : Delegard et al. | |

It is certified that error appears in the above-identified patent and that said Letters Patent is hereby corrected as shown below:

On the Title Page

In Item (72), in "Inventors", in Column 1, Line 5, delete "Matthew" and insert --Mathew-- therefor Signed and Sealed this
Eighteenth Day of November, 2025

John A. Squires
*Director of the United States Patent and Trademark Office*